3,037,984
DERIVATIVES OF N-AMINO-1,2,3,4-
TETRAHYDROISOQUINOLINE
John H. Biel, Milwaukee, Wis., assignor, by mesne assignments, to Lakeside Laboratories, Inc., Milwaukee, Wis., a corporation of Delaware
No Drawing. Filed Jan. 27, 1960, Ser. No. 4,878
9 Claims. (Cl. 260—287)

This invention relates to N-amino-1,2,3,4-tetrahydroisoquinoline. More particularly, this invention is concerned with novel N-substituted derivatives of N-amino-1,2,3,4-tetrahydroisoquinoline, processes of producing such compounds, and uses therefor.

This application is a continuation-in-part of my copending application Serial No. 681,189, filed August 30, 1957, now Patent No. 2,932,646, which is a continuation of my then copending application Serial No. 636,493, filed January 28, 1957, and now abandoned and is a continuation-in-part of my copending application Serial No. 781,190, filed December 18, 1958.

According to the present invention there are provided novel compounds of the formula

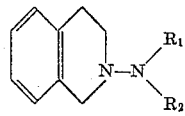

wherein $R_1$ is hydrogen, a lower alkyl of 1 to 8 carbons such as methyl, ethyl, propyl, butyl, pentyl, hexyl and isopropyl and aralkyl groups and particularly phenyl-lower alkyl groups such as benzyl, phenyl-ethyl, phenyl-isopropyl and phenylbutyl, and $R_2$ is the same or different radicals of the group represented by $R_1$ but is not hydrogen, intermediates useful in producing such compounds, and acid addition and quaternary ammonium salts thereof.

N-(N'-lower alkyl)-amino-1,2,3,4-tetrahydroisoquinolines and N-(N'-phenyl-lower alkyl)-amino-1,2,3,4-tetrahydroquinolines are produced by reacting N-amino-1,2,3,4-tetrahydroquinoline with a lower alkyl aldehyde or phenyl-lower alkyl aldehyde and subsequently reducing the intermediate hydrazone to the desired hydrazine. This process can be represented as follows:

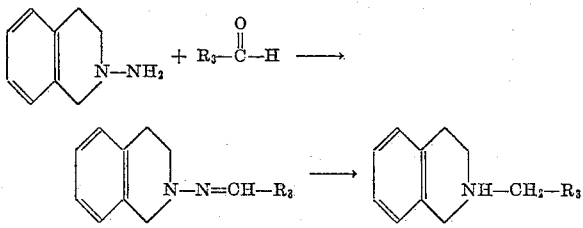

wherein $R_3$ is hydrogen, a lower alkyl of 1 to 7 carbons such as methyl, ethyl, isopropyl, butyl, pentyl and hexyl, phenyl, and phenyl-lower alkyl groups such as phenyl-ethyl, phenylisopropyl and phenylbutyl, and —$CH_2$—$R_3$ has the same meaning as $R_2$ previously defined.

Among the aldehydes which may be used in this process are formaldehyde, acetaldehyde, propionaldehyde, butyraldehyde, benzaldehyde, phenylacetaldehyde and the like.

The aldehyde and N-amino-1,2,3,4-tetrahydroisoquinoline react in the presence of water. Room temperature may be used although elevated temperatures such as the reflux temperature serve to increase the reaction rate. From 1 to 5 hours is usually sufficient to complete the reaction. Recovery of the hydrazone is conveniently achieved by conventional procedures. Thus, an alkali metal hydroxide may be used to salt out the product which may then be extracted with an organic solvent such as ether. The product may be isolated by distillation under reduced pressure.

Representative of the hydrazones so produced are:

N-methylidenylamino-1,2,3,4-tetrahydroisoquinoline,
N-ethylidenylamino-1,2,3,4-tetrahydroisoquinoline,
N-propylidenylamino-1,2,3,4-tetrahydroisoquinoline,
N-hexylidenylamino-1,2,3,4-tetrahydroisoquinoline,
N-benzylidenylamino-1,2,3,4-tetrahydroisoquinoline, and
N-phenylethylidenylamino-1,2,3,4-tetrahydroisoquinoline.

These hydrazones and others within this invention are conveniently reduced chemically or catalytically to the corresponding hydrazines. Lithium aluminum hydride is the preferred reducing agent. The reduction with this agent may be conveniently effected by intimately combining the reactants in an inert organic solvent such as anhydrous ether, dioxane and tetrahydrofuran. Elevated temperatures such as the reflux temperature enhance the reaction. At a reflux temperature, from 1 to 8 hours is usually sufficient to substantially complete the reaction. After the reaction is terminated, water may be added to the mixture to decompose excess lithium aluminum hydride. To recover the product, the organic phase is separated and the aqueous residue extracted with the same solvent. The organic phase and extracts then may be combined, dried, and the product distilled.

The N-(N'-lower alkyl)-amino-1,2,3,4-tetrahydroisoquinolines and N-(N'-phenyl-lower alkyl)-amino-1,2,3,4-tetrahydroisoquinolines can also be produced by two additional processes.

One of these processes comprises reacting N-amino-1,2,3,4-tetrahydroisoquinoline with a lower alkyl ester of a lower carboxylic acid or phenyl-lower-alkyl carboxylic acid followed by reduction of the intermediate hydrazide. This process can be represented as follows:

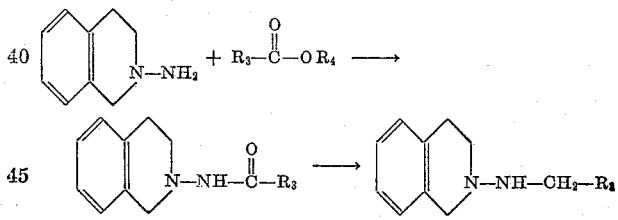

wherein $R_3$ has the significance previously assigned and $R_4$ is a lower alkyl such as methyl, ethyl, propyl and butyl.

Ethyl formate, methyl acetate, ethyl propionate, methyl butyrate, methyl benzoate and ethyl phenylacetate are representative esters which may be used in the process.

Reaction is conveniently achieved by refluxing N-amino-1,2,3,4-tetrahydroisoquinoline and the ester under suitable solvent conditions. Esters which are liquid may function both as reactant and solvent. The reaction is completed generally in several hours after which the excess solvent and reactant can be removed by distillation. The product can be crystallized from a suitable solvent.

Some hydrazides prepared in this way are N-(N'-formyl)-amino-1,2,3,4-tetrahydroisoquinoline, N-(N'-acetyl)-amino-1,2,3,4-tetrahydroisoquinoline, N-(N'-benzoyl)-amino-1,2,3,4-tetrahydroisoquinoline, N-(N'-phenylacetyl)-amino-1,2,3,4-tetrahydroisoquinoline, N-(N'-propionyl)-amino-1,2,3,4-tetrahydroisoquinoline and N-(N'-formyl)-amino-1,2,3,4-tetrahydroisoquinoline.

These and other hydrazides may be conveniently reduced to the corresponding hydrazines with a suitable reducing agent of which lithium aluminum hydride is preferred.

N-amino-1,2,3,4-tetrahydroisoquinoline can also be substituted by reacting it with a suitable acid halide followed by reduction of the intermediate hydrazide. This process may be represented as follows:

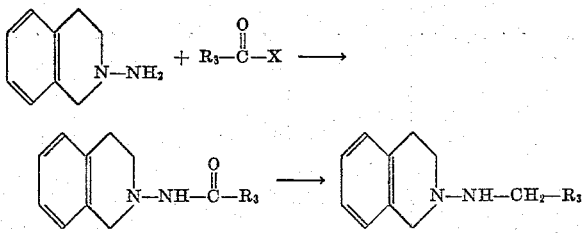

wherein $R_3$ has the significance previously assigned and X is a halogen, and particularly chlorine or bromine.

Reaction between the acid halide and N-amino-1,2,3,4-tetrahydroisoquinoline can be carried out by mixing equimolar quantities of the acid halide and hydrazine in a suitable solvent such as ethyl alcohol, isopropyl alcohol, benzene or ethyl ether in the presence or absence of an acid acceptor such as triethylamine or tri-n-propylamine. After the reaction the hydrazide may be recovered by conventional procedures.

The secondary hydrazines of the formula

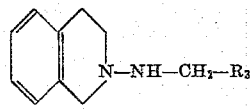

wherein $R_3$ has the significance previously assigned, can be further alkylated with an alkyl or aralkyl halide or a lower alkyl ester of a lower carboxylic acid or aryl-lower carboxylic acid. These reactions may be represented as follows:

(a)

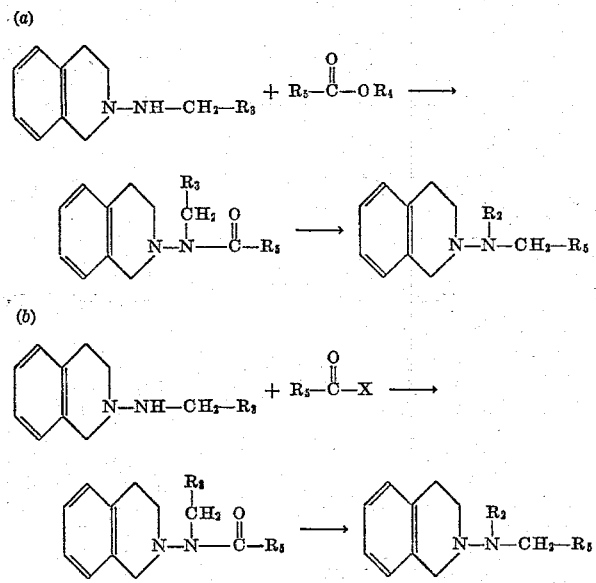

(b)

wherein X, $R_3$ and $R_4$ have the significance previously assigned and $R_5$ is hydrogen, a lower alkyl of 1 to 7 carbons such as methyl, ethyl, isopropyl, butyl, pentyl and hexyl, phenyl, and phenyl-lower alkyl groups such as phenylethyl, phenyl-isopropyl and phenylbutyl, and —$CH_2$—$R_5$ and —$CH_2$—$R_3$ have the same meaning as $R_2$ above but the groups need not be the same.

Thus, N-(N'-methyl)-amino-1,2,3,4-tetrahydroisoquinoline can be reacted with ethylformate to form N-(N'-methyl-N'-formyl)-amino-1,2,3,4 - tetrahydroisoquinoline which hydrazide upon reduction yields N-(N',N'-dimethyl)-amino-1,2,3,4-tetrahydroisoquinoline.

Similarly, N-(N'-ethyl)-amino - 1,2,3,4 - tetrahydroisoquinoline can be reacted with acetyl chloride to form N-(N'-ethyl-N'-acetyl)-amino-1,2,3,4-tetrahydroisoquinoline which is reduced to N-(N',N'-diethyl)-amino-1,2,3,4-tetrahydroisoquinoline.

The hydrazones and hydrazines form acid addition salts and quaternary ammonium salts.

Acid addition salts are produced by contacting the hydrazines with a suitable acid such as a mineral acid like sulfuric acid or hydrochloric acid or organic acids such as formic acid, citric acid, maleic acid and complex acids such as penicillin. Generally, one mole of the hydrazine compound reacts with one mole equivalent of acid.

Quaternary ammonium salts of the hydrazines are prepared by contacting the bases with alkylating agents, preferably in the presence of a suitable organic solvent. Alkylating agents such as lower alkyl halides, including methyl chloride, ethyl bromide, methyl bromide, alkylating agents like methyl and ethyl sulphate, as well as aryl substituted alkylating agents like o-chlorobenzyl bromide, phenylethyl chloride, and phenylpropyl bromide are representative compounds which form quaternary ammonium salts with the hydrazines.

The compounds, as nontoxic acid addition salts, have long-acting diuretic activity. In addition, these compounds are potent inhibitors of monoamine oxidase. Thus, N-(N'-methyl)-amino-1,2,3,4 - tetrahydroisoquinoline hydrochloride is a monoamine oxidase inhibitor equal in potency to iproniazid, which is a widely known therapeutic agent used in the treatment of mental depression. The compounds of this invention are thus useful in the treatment of mental depression in animals. N-amino-1,2,3,4-tetrahydroisoquinoline, the prior art compound, has not been found to be a monoamine oxidase inhibitor at concentrations which the N-methyl derivative has been found active.

The described derivatives of N-amino-1,2,3,4-tetrahydroisoquinoline are advisably employed in the described uses in the form of nontoxic acid addition salts such as the hydrochloride, hydrobromide, fumarate and sulfate. The compounds can be administered to animals and humans as pure compounds. It is advisable, however, to first combine one or more of the novel compounds with a suitable pharmaceutical carrier to attain a more satisfactory size to dosage relationship.

Pharmaceutical carriers which are liquid or solid may be used. The preferred liquid carrier is water. Flavoring materials may be included in the solutions as desired.

Solid pharmaceutical carriers such as starch, sugar, talc and the like can be used to form powders. The powders may be used as such for direct administration to a patient or, instead, the powders may be added to suitable foods and liquids, including water, to facilitate administration.

The powders also may be used to make tablets, or to fill gelatin capsules. Suitable lubricants like magnesium stearate, binders such as gelatin, and disintegrating agents like sodium carbonate in combination with citric acid may be used to form the tablets.

Unit dosage forms such as tablets and capsules may contain any suitable predetermined amount of one or more of the compounds and may be administered one or more at a time at regular intervals. Such unit dosage forms, however, should generally contain a concentration of 0.1% to 10% by weight of one or more of the active compounds. Unit dosage tablets and capsules containing 10 to 75 mg. are particularly useful. A dosage schedule of 35 mgm. tablets one to three times a day is often satisfactory.

A typical tablet may have the composition:

|  | Mg. |
|---|---|
| (1) N-(N'-methyl)-amino-1,2,3,4-tetrahydroisoquinoline HCl | 35 |
| (2) Starch U.S.P. | 57 |
| (3) Lactose U.S.P. | 73 |
| (4) Talc U.S.P. | 9 |
| (5) Stearic acid | 6 |

Powders 1, 2 and 3 are slugged, then granulated, mixed with 4 and 5, and tableted.

The following examples are presented to illustrate the production of compounds within the scope of this invention.

EXAMPLE 1

*N-Amino-1,2,3,4-Tetrahydroisoquinoline*

To 26.6 g. of 1,2,3,4-tetrahydroisoquinoline in 120 cc. of water are added with stirring and cooling 51 g. of 30% aqueous $H_2SO_4$. The mixture is cooled to 5–10° C. and 34.2 g. of sodium nitrite dissolved in 60 cc. of water added, keeping the temperature below 10° C. After the addition is completed, stirring is continued at room temperature for two hours. The aqueous suspension is extracted with ether and the ether extracts washed with concentrated potassium hydroxide solution. The ether extracts are dried with potassium carbonate and then added to 8.8 g. of lithium aluminum hydride suspended in 100 cc. of anhydrous ether. After completion of the addition, the mixture is stirred for two hours with refluxing and the complex decomposed with 40% aqueous potassium hydroxide. The ether layer is decanted and dried with $K_2CO_3$. The product is collected by distillation; B.P. 85° C. (0.5 mm.).

*Analysis.*—Calcd. for $C_9H_{12}N_2$: N, 9.45. Found: N, 9.35.

The maleate salt was prepared and had a melting point of 128–130° C.

The hydrochloride salt had a melting point of 208–209° C.

EXAMPLE 2

*N-Formylamino-1,2,3,4-Tetrahydroisoquinoline*

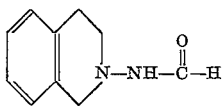

21 g. of N-amino-1,2,3,4-tetrahydroisoquinoline was added to 210 g. of ethyl formate and the mixture refluxed for 4 hours on the steam bath. The excess ethyl formate was removed by distillation, and 27 g. of solid remained which was recrystallized from 55 cc. of hot ethanol.

Yield 13.8 g., M.P. 129° C.

*Analysis.*—Calcd. for $C_{10}H_{12}N_2O$: N, 7.95. Found: N, 7.87.

EXAMPLE 3

*N-(N'-Methyl)-Amino-1,2,4,3-Tetrahydroisoquinoline*

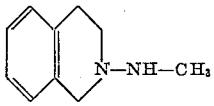

To 3.4 g. (0.09 mole) of $LiAlH_4$ in 150 cc. of tetrahydrofuran was added with stirring a solution of 13.6 g. (0.077 mole) of N-(N'-formyl)-amino tetrahydroisoquinoline in 160 cc. of tetrahydrofuran. The mixture was refluxed for 4 hours, the complex decomposed with 40% aqueous KOH and the product isolated by distillation. B.P. 85–88° C. (0.85 mm.).

Yield 10.8 g. (86%); $N_D^{20}$ 1.5573.

*Analysis.*—Calcd. for $C_{10}H_{14}N_2$: N, 8.64. Found: N, 8.65.

The maleate salt was prepared in ethanol, M.P. 156–157° C.

*Analysis.*—Calcd. for $C_{10}H_{14}N_2 \cdot C_4H_4O_4$: N, 5.04; maleic acid content: 41.71. Found: N, 5.00; maleic acid content: 43.12.

The mono-hydrochloride salt was prepared in ethanol, M.P. 186–187° C.

*Analysis.*—Calcd. for $C_{10}H_{15}ClN_2$: Cl, 17.85; N, 6.90. Found: Cl, 17.90; N, 7.05.

EXAMPLE 4

*N-(N'-Methyl-N'-Formyl)-Amino-1,2,3,4-Tetrahydroisoquinoline*

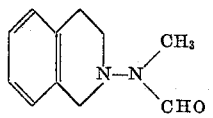

A mixture containing 16.2 g. (0.10 mole) of the compound of Example 3 and 111 g. (1.5 moles) of ethyl formate was refluxed for 7 hours. The excess ethyl formate was removed by distillation in vacuo and the product crystallized as a yellow solid, M.P. 85° C.

Yield 19 g.

EXAMPLE 5

*N-(N'-N'-Dimethyl)-Amino-1,2,3,4-Tetrahydroisoquinoline*

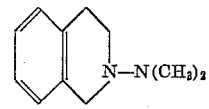

The formyl derivative of Example 4 was reduced in the manner described in Example 3; yield 13.7 g. (77%); B.P. 85° C. (0.5 mm.) $N_D^{20}$ 1.5451.

*Analysis.*—Calcd. for $C_{11}H_{16}N_2$: N, 7.95. Found: N, 8.01.

EXAMPLE 6

*N-(N'-N'-Dimethyl)-Amino-1,2,3,4-Tetrahydroisoquinoline Hydrochloride*

The salt was prepared in isopropyl alcohol, M.P. 183–184° C.

*Analysis.*—Calcd. for $C_{11}H_{17}ClN_2$: Cl, 16.68; N, 6.59. Found: Cl, 16.12; N, 6.69.

Various changes and modifications of the invention can be made and, to the extent that such variations incorporate the spirit of this invention, they are intended to be included within the scope of the appended claims.

What is claimed is:

1. A member of the group consisting of compounds of the formula

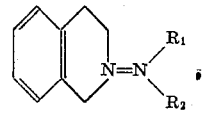

nontoxic pharmaceutically acceptable acid addition salts thereof, and quaternary ammonium salts thereof of the group consisting of lower alkyl halides, methyl sulphate, ethyl sulphate, o-chlorobenzyl bromide, phenylethyl chloride and phenylpropyl bromide, wherein $R_1$ is a member of the group consisting of lower alkyl and phenyl-lower alkyl groups, $R_2$ is a member of the group consisting of hydrogen, lower alkyl, and phenyl-lower alkyl groups.

2. N-formylamino-1,2,3,4-tetrahydroisoquinoline.

3. N-(N'-methyl)-amino-1,2,3,4 - tetrahydroisoquinoline.

4. N-(N'-methyl-N'-formyl)-amino - 1,2,3,4 - tetrahydroisoquinoline.

5. N-(N',N'-dimethyl)-amino - 1,2,3,4 - tetrahydroisoquinoline.

6. N-(N',N'-dimethyl)-amino - 1,2,3,4 - tetrahydroisoquinoline hydrochloride.

7. N-(N'-methyl)-amino - 1,2,3,4 - tetrahydroisoquinoline hydrochloride.

8. A member of the group consisting of compounds of the formula

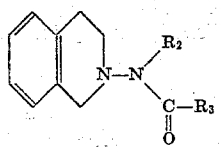

and nontoxic pharmaceutically acceptable acid addition salts and quaternary ammonium salts thereof of the group consisting of lower alkyl halides, methyl sulphate, ethyl sulphate, o-chlorobenzyl bromide, phenylethyl chloride and phenylpropyl bromide, wherein $R_2$ is a member of the group consisting of hydrogen, lower alkyl, and phenyl-lower alkyl groups and $R_3$ is a member of the group consisting of hydrogen, lower alkyl and phenyl-lower alkyl groups.

9. A member of the group consisting of compounds of the formula

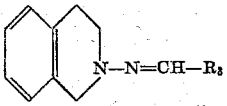

and nontoxic pharmaceutically acceptable acid addition salts and quaternary ammonium salts thereof of the group consisting of lower alkyl halides, methyl sulphate, ethyl sulphate, o-chlorobenzyl bromide, phenylethyl chloride and phenylpropyl bromide, wherein $R_3$ is a member of the group consisting of hydrogen, lower alkyl and phenyl-lower alkyl groups.

References Cited in the file of this patent

UNITED STATES PATENTS

| | | |
|---|---|---|
| 2,663,706 | Conroy | Dec. 22, 1953 |
| 2,694,714 | Brody | Nov. 16, 1954 |
| 2,804,422 | Schumann et al. | Aug. 27, 1957 |
| 2,883,385 | Huebner et al. | Apr. 21, 1959 |
| 2,902,404 | Spencer | Sept. 1, 1959 |
| 2,932,646 | Biel | Apr. 12, 1960 |
| 2,955,108 | Omietanski | Oct. 4, 1960 |

OTHER REFERENCES

Beilstein: Handbuch der org. Chem., 4th ed., vol. 20, page 279 (1935).

UNITED STATES PATENT OFFICE
CERTIFICATE OF CORRECTION

Patent No. 3,037,984                              June 5, 1962

John H. Biel

It is hereby certified that error appears in the above numbered patent requiring correction and that the said Letters Patent should read as corrected below.

Column 6, lines 50 to 54, the formula should appear as shown below instead of as in the patent:

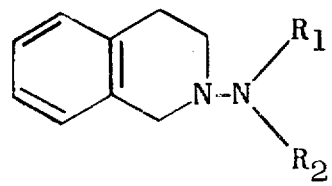

Signed and sealed this 18th day of September 1962.

(SEAL)
Attest:

ERNEST W. SWIDER
Attesting Officer

DAVID L. LADD
Commissioner of Patents